Nov. 7, 1967   J. W. GREK   3,351,034
TOWING AND CUTTING DEVICE
Filed Sept. 29, 1964   8 Sheets-Sheet 1

FIG.1

INVENTOR
JOHN W. GREK

BY
Mason, Porter, Diller & Stewart
ATTORNEYS

Nov. 7, 1967

J. W. GREK 3,351,034

TOWING AND CUTTING DEVICE

Filed Sept. 29, 1964

INVENTOR
JOHN W. GREK

BY
Mason, Porter, Diller & Stewart
ATTORNEYS

Nov. 7, 1967   J. W. GREK   3,351,034
TOWING AND CUTTING DEVICE
Filed Sept. 29, 1964   8 Sheets-Sheet 5

FIG. 5

INVENTOR
JOHN W. GREK

BY Mason, Porter, Diller & Stewart
ATTORNEYS

United States Patent Office 3,351,034
Patented Nov. 7, 1967

3,351,034
TOWING AND CUTTING DEVICE
John W. Grek, Lisle, Ill., assignor to Continental Can Company, Inc., New York, N.Y., a corporation of New York
Filed Sept. 29, 1964, Ser. No. 400,044
23 Claims. (Cl. 113—1)

ABSTRACT OF THE DISCLOSURE

An apparatus for towing continuous tubular material and severing the tubular material into discrete tubular bodies. The towing mechanism including a plurality of cooperative elements which externally grip the tubular material, and also include cooperative aligned severing means whereby outward expansion of the tubular material during the towing thereof causes its severance into discrete bodies.

This invention relates in general to new and useful improvements in apparatus for the forming of can bodies, and more particularly to a novel towing and cutting device for use in conjunction with continuous welded tubing for the formation of can bodies therefrom.

At the present time there have been devised suitable methods for continuously welding tubing from a strip which may be provided on a continuous basis. However, once the strip has been formed into tubing, it must be separated into can body lengths in an economically feasible manner. It is to this that the present invention relates.

A primary object of this invention is to provide a novel towing device which may be utilized for the purpose of towing tubing which is being continuously shaped from a strip and provided with a longitudinal welded seam, the towing device being characterized in that it is additionally provided with means for severing the tubing at accurately spaced intervals of length for the purpose of making can bodies from the tubing.

Another object of this invention is to provide a novel apparatus for simultaneously towing tubing and cutting the same into predetermined accurate lengths.

Yet another object of this invention is to provide a novel apparatus which may be used in conjunction with apparatus for forming tubing from flat strips on a continuous basis, the apparatus being used for the purpose of towing the tubing through the tubing forming apparatus and at the same time severing the tubing into can bodies of predetermined lengths.

A further object of this invention is to provide, in a towing device, gripping elements which are arranged in cooperative paths and which have mounted therein cutting dies and flanging dies, as well as means for effectively gripping a length of tubing whereby the tubing may not only be accurately towed by the towing device, but also when the tubing is passed over a mechanism for outwardly expanding the tubing, the tubing will automatically be severed and the severed ends flanged in the manner necessary in the forming of can bodies.

Another object of this invention is to provide a novel towing device which has incorporated therein means for effecting the severing of tubing and the flanging of the severed tubing utilizing magnetic impulse.

Still another object of this invention is to provide a novel conveying device for towing tubing, the conveying device including a pair of endless conveyors having mounted thereon cooperative gripping elements, and one of the endless conveyors being provided with fixedly mounted supports and the other of the endless conveyors being provided with adjustably mounted supports whereby the other endless conveyor may be adjusted towards and away from the one endless conveyor to effect the necessary cooperative engagement of the gripping elements carried by the two endless conveyors.

A still further object of this invention is to provide a combined towing and cutting device for use with continuous welded tubing, the combined towing and cutting device including a plurality of gripping elements each of which is provided with tube gripping means and a cutting die, the gripping elements being carried by endless conveyor chains with each of the conveyor chains having mounted thereon a plurality of brackets, and there being means provided for adjustly securing the gripping elements to respective ones of the brackets, whereby the spacing between cutting dies of adjacent gripping elements may be accurately controlled and tubing towed and cut by the gripping elements may be separated into accurate predetermined lengths.

Yet another object of this invention is to provide a novel tube gripping unit which includes a pair of cooperating gripping elements, each of the gripping elements being provided with a central insert which includes a centrally located cutting die and a pair of flanging dies disposed on opposite sides of the cutting die, and the gripping element further including a pair of resilient gripping members which are disposed adjacent the flanging dies remote from the cutting die, the gripping members being formed of a resilient material and being resiliently mounted within the gripping element so as to normally project slightly from the tube opposing surface of the gripping element.

A further object of this invention is to provide a novel towing and cutting device for use in conjunction with continuously formed tubing, the towing and cutting device including a pair of endless conveyor members on which cooperating pairs of gripping elements are mounted for movement in unison along a predetermined path for the purpose of gripping and towing a tube, the gripping elements being secured to the endless conveyor members for relative sliding and pivotal movement, and there being suitable cam means associated with the endless conveyors and engageable with the gripping elements to control the path of movement of the gripping elements and effect the movement thereof relative to the conveyor members, the mounting of the gripping elements and the arrangement of the cam means being such that the gripping elements will be brought into transverse alignment on opposite sides of tubing, after which the gripping elements are moved together to effectively clamp the tubing and whereby after the tubing has been severed and flanged utilizing the towing and cutting device, the gripping elements will be moved transversely of the path of movement of the tubing and away from the tubing before they move out of alignment with one another.

With the above, the other objects in view that will hereinafter appear, the nature of the invention will be more clearly understood by reference to the following detailed description, the appended claims and the several views illustrated in the accompanying drawings:

Figures 6, 12:
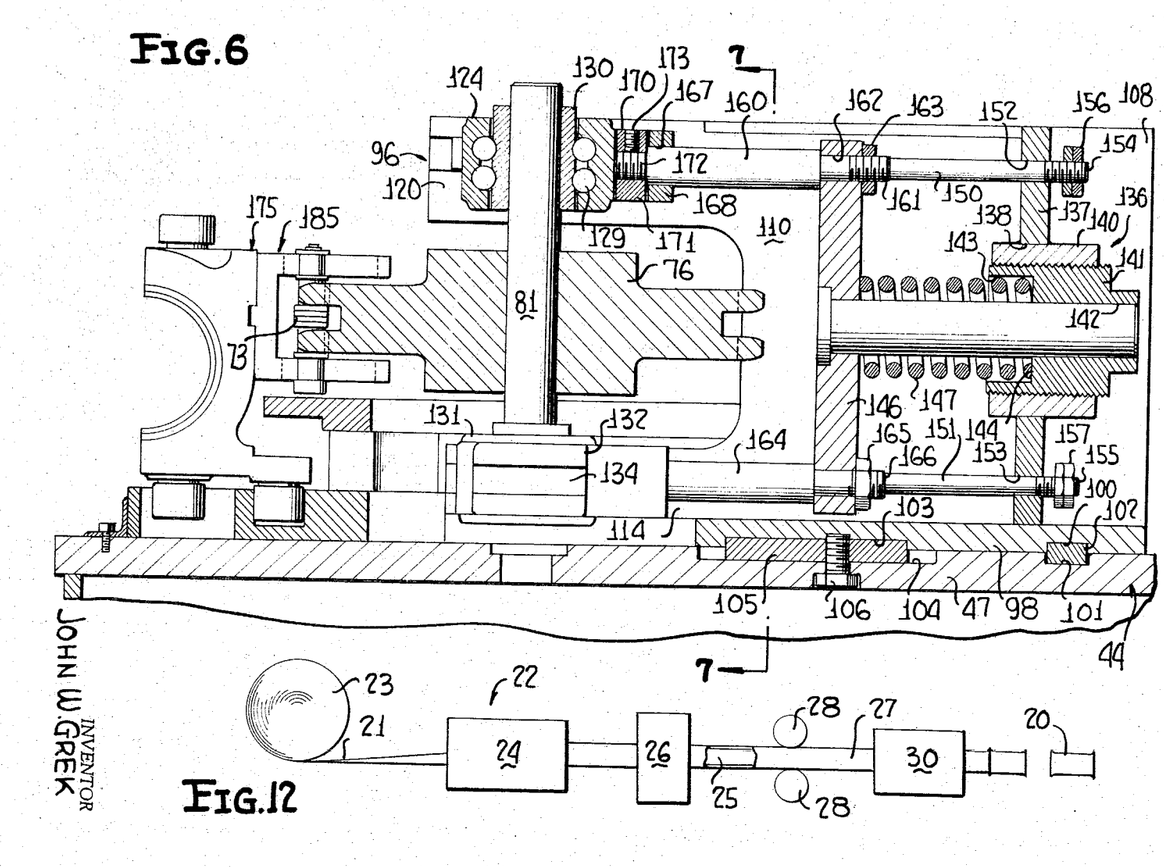
FIGURE 6 is an enlarged fragmentary longitudinal sectional view taken along the line 6—6 of FIGURE 1 and shows the specific manner in which the bearings for the idler sprocket supporting one of the endless conveyor chains is resiliently mounted for the purpose of maintaining the necessary tension on the conveyor chain.
FIGURE 12 is a schematic view showing the environmental relationship of the towing and cutting device with respect to apparatus for continuously forming tubing.

Referring now to the drawings in detail, reference is first made to FIGURE 12 wherein there is illustrated an over-all apparatus for forming individual can bodies 20 on a continuous basis from strip stock 21, the apparatus being generally referred to by the numeral 22. The strip stock 21 is normally provided in the form of a coil 23 and is first passed through a shaping apparatus, generally referred to by the numeral 24 which gradually shapes the moving strip from a flat state to a substantially unseamed tubular shape. The shaped strip passes over a supporting horn 25 and through a welding apparatus 26 wherein opposed edges of the unseamed tube are welded together in a continuous welding operation. The resultant tube 27 is then guided along the horn 25 by means including a pair of guide rolls 28 and passes into a towing and cutting device in accordance with this invention, the towing and cutting device being generally referred to by the numeral 30. In accordance with this invention, within the towing and cutting device 30 the tube or tubing 27 is severed into accurate predetermined lengths and the severed ends of the tubing are flanged so that the tubing 27 passes out of the towing and cutting device 30 in the form of flanged can bodies 20. At this time it is pointed out that the towing and cutting device 30 firmly grips the tubing 27 and effects the towing of the tubing through the welding apparatus 26 and along the horn 25.

Figure 1:
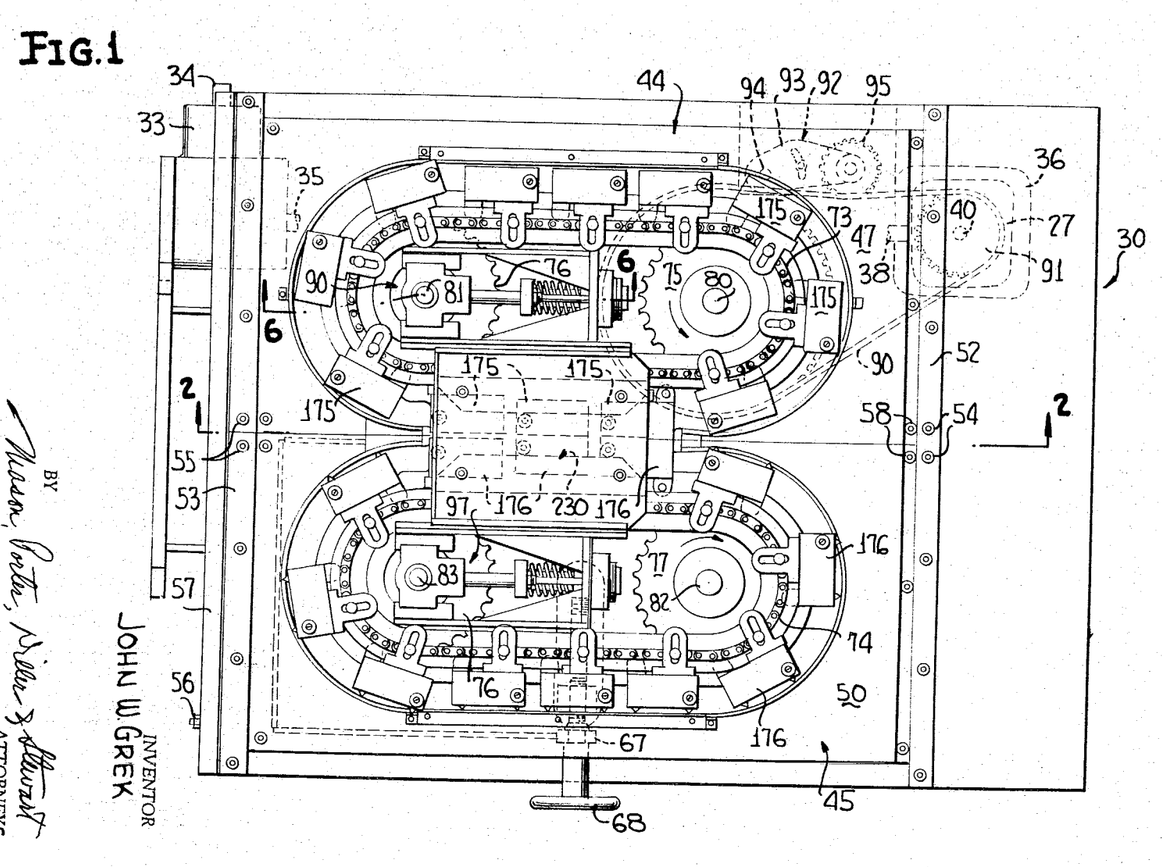
FIGURE 1 is a plan view of the towing and cutting device which is the subject of this invention.

The towing and cutting device 30 includes a suitable machine base which is generally referred to by the numeral 31. Among other structural elements, the machine base 31 includes an upper platform 32. There is mounted within the machine base 31 at one corner thereof, as is best shown in FIGURE 1, a variable ratio drive unit 33 of the conventional type which includes an input shaft 34 and an output shaft 35. Any suitable drive means may be connected to the input shaft 34.

Figure 2:
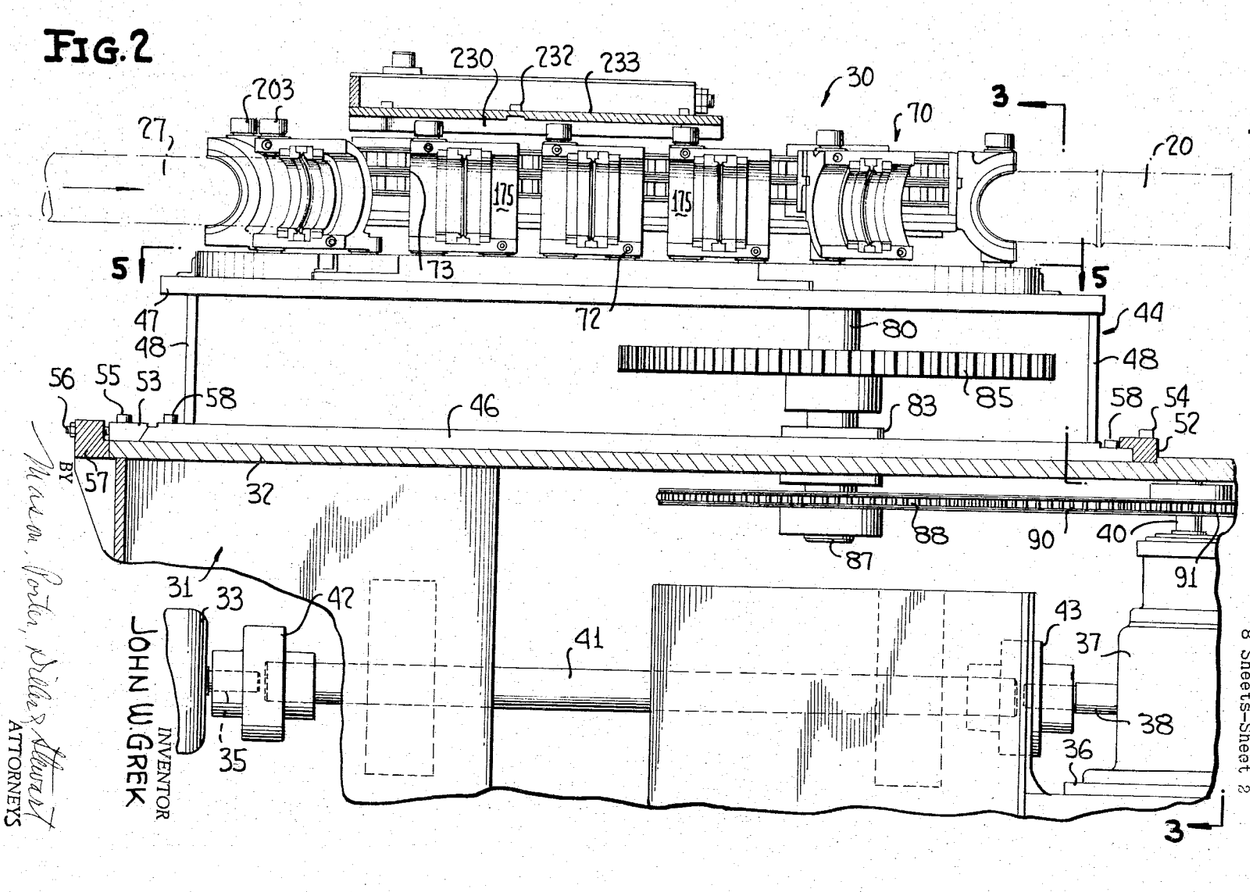
FIGURE 2 is a longitudinal vertical sectional view taken along the line 2—2 of FIGURE 1 and shows the specific details of one half of the towing and cutting device and the drive means therefor.

Referring now to FIGURE 2, it will be seen that the machine base 31 includes a suitable supporting platform 36 generally at the upper right-hand corner thereof, as viewed in FIGURE 1. A right angle drive unit 37 is mounted on the platform 36 and includes an input shaft 38 and a vertically disposed output shaft 40. The input shaft 38 is aligned with the output shaft 35 of the variable speed drive unit 33 and a drive shaft 41 extends between the two shafts 35 and 38. The shaft 41 is connected to the shaft 35 by means of a coupling 42 and to the shaft 38 by means of a coupling 43.

The machine base 31 carries two support units 44 and 45 which are identical in construction. The support unit 44 includes a base 46 and a platform 47 with the two being connected together by suitable upstanding vertical plates 48. The support unit 45 also includes a base 49 and an upper platform 50 which are connected together by suitable upstanding plates 51.

The base 46 of the support unit 44 is seated on the platform 32 and is positioned thereon by means of transversely extending hold-down bars 52 and 53. The hold-down bar 52 is secured to the platform 32 by means of fasteners 54 while the hold-down bar 53 is adjustably secured to the platform 32 by means of fasteners 55. It is to be noted that the hold-down bar 53 has a beveled edge which partially overlies and engages a complementary beveled edge of the base 46. The hold-down bar 53 is adjustable relative to the platform 32 by means of adjusting screws 56 carried by an L-shaped extension 57 extending along an associated edge of the platform 32. The adjusting screws 56 engage the hold-down bar 53 and control the position thereof. The base 46 is secured in its adjusted position on the platform 32 by means of bolts 58.

Figure 3:
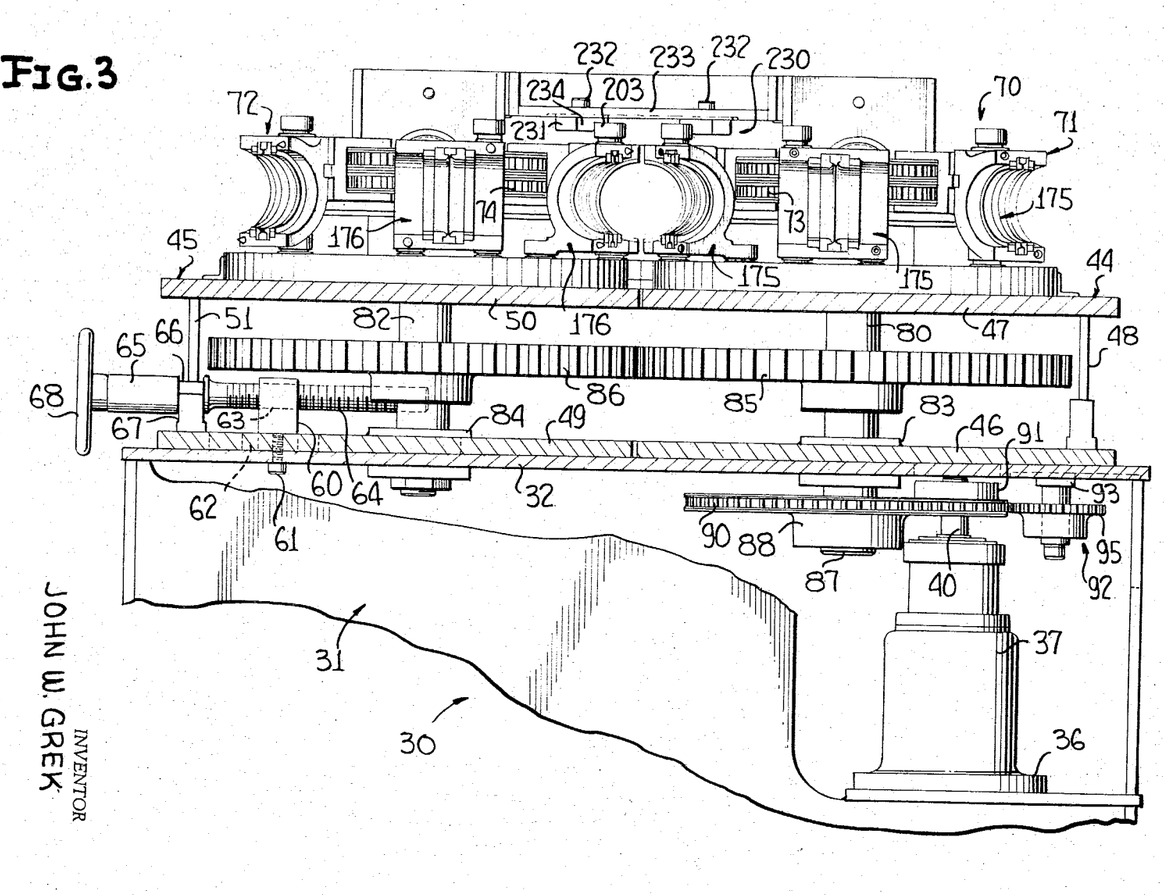
FIGURE 3 is an enlarged transverse vertical sectional view taken along the line 3—3 of FIGURE 2 and shows further details of the device.

It will be readily apparent that the hold-down bars 52 and 53 also serve to position the base 49 of the support unit 45 on the platform 46. However, in order to accomplish a necessary relative adjustment of mechanisms carried by the support units 44 and 45, the mechanisms to be described in detail hereinafter, the support unit 45 is mounted for controlled adjustment with respect to the platform 32. In FIGURE 3, it will be seen that the platform 32 is provided with a suitable upstanding block 60 which is secured to the platform 32 by means of fasteners 61 and which projects through a slot 62 in the base 49. The block 60 has an internally threaded bore 63 and an adjusting screw 64 is threadedly engaged in the block 60. The adjusting screw 64 has a shank portion 65 with a groove 66 formed therein to define opposed shoulders. The shank portion of the adjusting screw 64 is seated in a mounting block 67 carried by the base 49 with the shoulders (unnumbered) of the groove 66 in abutment with opposite sides of the mounting block 67. A handle 68 is rotated to turn the adjusting screw 64 to thread or unthread the same relative to the block 60 and thus shift the support unit 45 relative to the support unit 44 in a manner clearly apparent from FIGURES 1 and 3 of the drawings.

A towing device generally referred to by the reference numeral 70 is supported by the two support units 44, 45. The towing device 70 consists of two substantially identical portions 71, 72 including respective endless chain conveyors 73, 74 respectively. The chain conveyor or conveyor member 73 is entrained about a drive sprocket 75 and an idler sprocket 76, and the chain conveyor or conveyor member 74 is similarly entrained about a drive sprocket 77 and an idler sprocket 78. The sprockets 75–78 are in a common horizontal plane and each is conventionally secured to a shaft 80–83 respectively. The shafts 80, 82 project downwardly through openings (not shown) in the respective platforms 47–50 (FIGURE 3), and are respectively journalled in conventional journalling blocks 83, 84 secured to the respective bases 46 and 49 of the support units 44 and 45. A drive gear 85 (FIGURE 3) is carried by the shaft 80 substantially midway between the base 46 and the platform 47 of the support unit 44. The gear 85 meshes with a gear 86 secured to the shaft 82. An end portion 87 of the shaft 80 projects downwardly beyond the journalling block 83 and a sprocket 88 is secured to this end portion. A drive chain 90 is entrained about the sprocket 88 and a sprocket 91 (FIGURE 1) secured to the shaft 40 of the right angle drive unit 37. Upon the rotation of the shaft 40 of the right angle drive unit 37, the drive chain 90 rotates the sprocket 88 and the shaft 80 carrying the gear 85. The gear 85 in turn rotates the gear 86 and the shaft 82 thus imparting movement to each of the conveyor members 73, 74 through the sprockets 75 and 77 respectively. The sprocket 75 is driven in a counterclockwise direction as viewed in FIGURES 1 and 4 of the drawings while the sprocket 77 is driven in a clockwise direction in the same views to impart left-to-right movement of the tubing 27 as will become more apparent hereafter.

The tension of the chain 90 is regulated by an adjustable mechanism 92 (FIGURES 1 and 3) comprising a plate 93 pivotally secured in a conventional manner at 94 to the upper platform 32 and carrying at an opposite end thereof a freely rotatable sprocket 95 in mesh with the chain 90, as is best illustrated in FIGURE 1 of the drawings. A generally arcuate slot (unnumbered) is formed in the plate 93 and a bolt (unnumbered) passes through this slot and is secured in a threaded aperture (unnumbered) in the upper platform 32. This arrangement permits the sprocket 95 to be adjusted relative to the chain 90 and secured in any adjusted position thereof in a manner clearly illustrated in FIGURE 1 to accomplish the tensioning of the chain 90.

Each of the conveyor members 73, 74 are similarly provided with means 96, 97 respectively for adjusting the tension of these conveyor members. The tension adjusting means 96, 97 are identical, and a description of the adjusting means 96 with particular attention directed to FIGURES 6 and 7 of the drawings will suffice for a complete understanding of each of the adjusting means 96, and 97.

The tension adjusting means 96 comprises a generally U-shaped base plate 98 (FIGURE 5) supported by the platform 47 of the support unit 44 (FIGURE 6). The base plate 98 includes a transverse slot 100 opening downwardly towards and in opposition to a complementary slot 101 (FIGURE 6) in the platform 47. A key 102 which is slightly shorter than the length of the slot 101 is positioned between this slot and the slot 100. A similar downwardly opening slot 103 (FIGURE 6) is formed in the plate 98 substantially normal to the slot 100 and opposes an upwardly opening slot 104 in the platform 47. A key 105 is positioned between the slots 103 and 104 in the manner clearly illustrated in FIGURE 6 of the drawings. The slots 100, 101, 103 and 104 cooperate with the keys 102, 105 to accurately position the plate 98 upon the platform 47 of the supporting unit 44. A bolt 106 and a bolt 107 pass through respective openings (unnumbered) in the platform 47 and through openings (unnumbered) in the respective keys 105 and 102, and are each threadably secured to the plate 98 to secure the same to the platform 47.

A pair of generally inverted C-shaped plates 108 and 110 are welded to the plate 98 of the tensioning means 96. The plate 108 includes an upper arm 111 spaced from a lower arm 112 while the plate 110 similarly includes an upper arm 113 spaced from a lower arm 114. An L-shaped member 115 (FIGURES 4 and 7) carrying a guiding block 116 is secured to the arm 111 of the inverted C-shaped plate 108. A similar generally L-shaped member 117 carrying a guiding block 118 is similarly secured to the arm 112 of the inverted C-shaped plate 108. The L-shaped members 115, 117 and the respective guide blocks 116 and 118 oppose similar inverted L-shaped members 120, and 121, carrying guide blocks 122 and 123 respectively secured to the arms 114 and 113 of the generally inverted C-shaped plate 110. The guide blocks 116 and 122 occupy a common horizontal plane (FIGURE 7) as do the guide blocks 118 and 123.

An upper journal 124 is provided with a pair of oppositely directed projections 125, 126 which are grooved at 127 and 128 respectively. The guide bar 116 rides in the groove 127 while the guide bar 122 rides in the groove 128, as is clearly illustrated in FIGURE 7 of the drawings. The shaft 81 passes through a sleeve 130 (FIGURE 6) which is journalled for rotation in the journal 124 by a plurality of anti-friction balls 129. The shaft 81 is similarly journalled at a lower end portion (unnumbered) beneath the sprocket 76 in a journal 131 which is identical in construction to the journal 124. The journal 131 similarly includes a pair of oppositely directed portions 132 and 133 having respective grooves 134 and 135 guidedly receiving the guide blocks 118 and 123 respectively. As the journals 124, 131 are simultaneously moved from right-to-left as viewed in FIGURES 4 and 6 of the drawings, the sprocket 76 is moved in a similar direction to increase the tension upon the conveyor member or chain 73 while movement in an opposite direction in the same figures decreases the tension on the conveyor member 73.

The journals 124 and 131 are moved simultaneously by an adjustable mechanism generally referred to by the reference numeral 136. The adjustable mechanism 136 is best illustrated in FIGURE 6 of the drawings and includes a vertical stationary plate 137 welded or otherwise conventionally secured between the inverted C-shaped plates 108, 110 and the generally U-shaped plate 98. The stationary plate 137 is provided with an opening 138 through which passes and is secured an internally threaded collar 140. A stud 141 is threadably received in the collar 140 and includes an axial bore 142 and a counter bore 143 terminating in an annular seat 144. A cylindrical rod 145 carried by a movable plate 146 is slidably received in the bore 142 of the stud 141. A spring 147 surrounding the rod 145 and seated between the movable plate 146 and the annular seat 144 normally urges the plate 146 from right-to-left as viewed in FIGURE 6 of the drawings.

Two rod portions 150, 151 forming integral portions of a pair of guide rods 160, 164 respectively are secured to upper and lower portions of the movable plate 146. The rod portions 150, 151 are also guidably received in apertures or openings 152, 153 respectively in the stationary plate 137. Opposite end portions 154 and 155 of the respective rod portions 150, 151 are threaded, and a pair of nuts 156, 157 are threadably secured to the respective threaded end portions 154, and 155. The rod portions 150, 151 serve to accurately guide the movement of the movable plate 146, and the pair of nuts 156, 157 limit right-to-left movement of the plate 146 as viewed in FIGURE 6 by abutment against the stationary plate 137.

The guide rod 160 further includes a reduced central threaded portion 161 passed through an opening 162 in an upper portion of the movable plate 146. A conventional nut 163 threadably secured to the central portion 161 secures the guide rod 160 to the plate 146 in the manner clearly illustrated in FIGURE 6.

The guide rod 164 is similarly secured to a lower portion of the movable plate 146 by a nut 165 secured to a central threaded portion 166 of the rod 164.

The guide rod 160 is received in a bore 167 of a reduced portion 168 of the journal 124. The reduced portion 168 of the journal 124 includes a vertical generally rectangular slot 170 in which is positioned a generally rectangular nut-like member 171. A threaded end portion 172 of the guide rod 160 is threadably received in the threaded opening (unnumbered) of the nut-like member 171, and a radial set screw 173 secures the threaded end portion 172 of the guide rod 160 in the nut-like member 171.

The journal 131 is secured to the rod 164 in a manner identical to the securement of the guide rod 160 to the journal 124, and a further description is considered unnecessary for a complete understanding of this invention.

The adjustable mechanism operates, as was heretofore noted, to increase or decrease the tension on the conveyor member 73. The tension is increased on the conveyor member 73 by threading the stud 141 toward the movable plate 146 to increase the tension of the spring 147 which urges the movable plate 146, the guide rods 160, 164 and the journals 124 and 131 to the left as viewed in FIGURE 6. By reversing this procedure and unthreading the stud 141 to decrease the tension of the spring 147 a decrease in the tensioning of the conveyor member 73 is obtained.

The mechanism 70 and each of the portions 71 and 72 thereof includes a plurality of identical gripping elements 175 carried by the conveyor member 73 and a plurality of similarly identical gripping elements 176 carried by the conveyor member 74.

Figure 8:
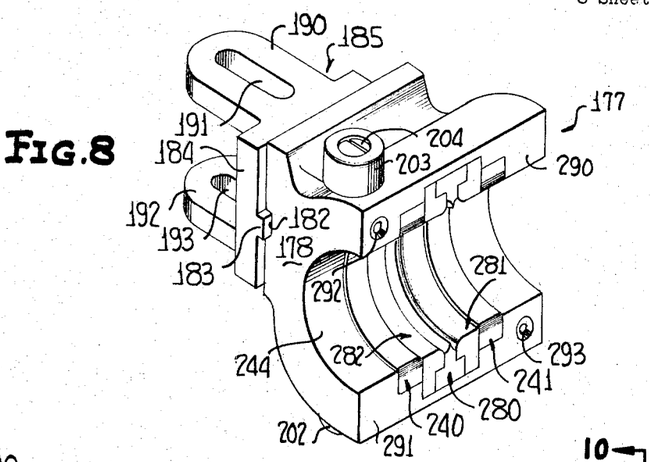
FIGURE 8 is a perspective view of one of the gripping elements and its associated mounting bracket and shows the specific details thereof.
Figure 9:
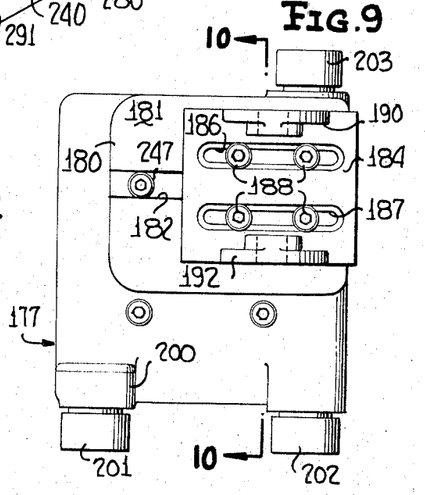
FIGURE 9 is an elevational view of the gripping element of FIGURE 8 is shown from the left side thereof.

Referring to FIGURES 8 through 11 of the drawings, a gripping element 177 of the plurality of gripping elements 175 will now be described. The gripping element 177 includes a generally C-shaped body 178 including a rearwardly projecting reduced portion 180 (FIGURE 9). The reduced portion 180 has a generally planar surface 181 which is interrupted by a keyway 182. A key 183 (FIGURE 10) projecting from a bight portion 184 of a generally U-shaped attaching or mounting bracket 185 is received in the keyway 182 of the gripping element portion 180. An elongated slot 186 (FIGURE 9) is provided in the bight portion 184 of the U-shaped mounting bracket 185 above the keys 183 and the keyways 182 while a similar elongated slot 187 is formed in the bight portion 184 below both the key 183 and the keyway 182. A pair of bolts 188 pass through the slot 186 and are threadably secured to the gripping element 180 in the manner illustrated in FIGURE 10 of the drawings. Identical bolts 188 are similarly passed through the slot 187 and threadably received in threaded bores (unnumbered) in the portion 180 of the gripping element 177. The keyway 182 and the key 183 maintain alignment between the body 178 of the gripping element 177 and the U-shaped bracket 185 in any selected position as determined by the position of the slots 186, 187 relative to the bolts 180.

The generally U-shaped mounting bracket 185 includes an upper arm 190 having an elongated slot 191 and a lower arm 192 provided with an identical elongated slot 193. The arms 190, 192 and the respective slots 191, 193 of the mounting bracket 185 secure the selected gripping element 177 and each of the generally identical gripping elements 175, 176 and the U-shaped mounting brackets 185 secured thereto to the respective conveyor members 73, 74 in a manner best illustrated in FIGURE 7 of the drawings to which attention is directed.

Figure 7:
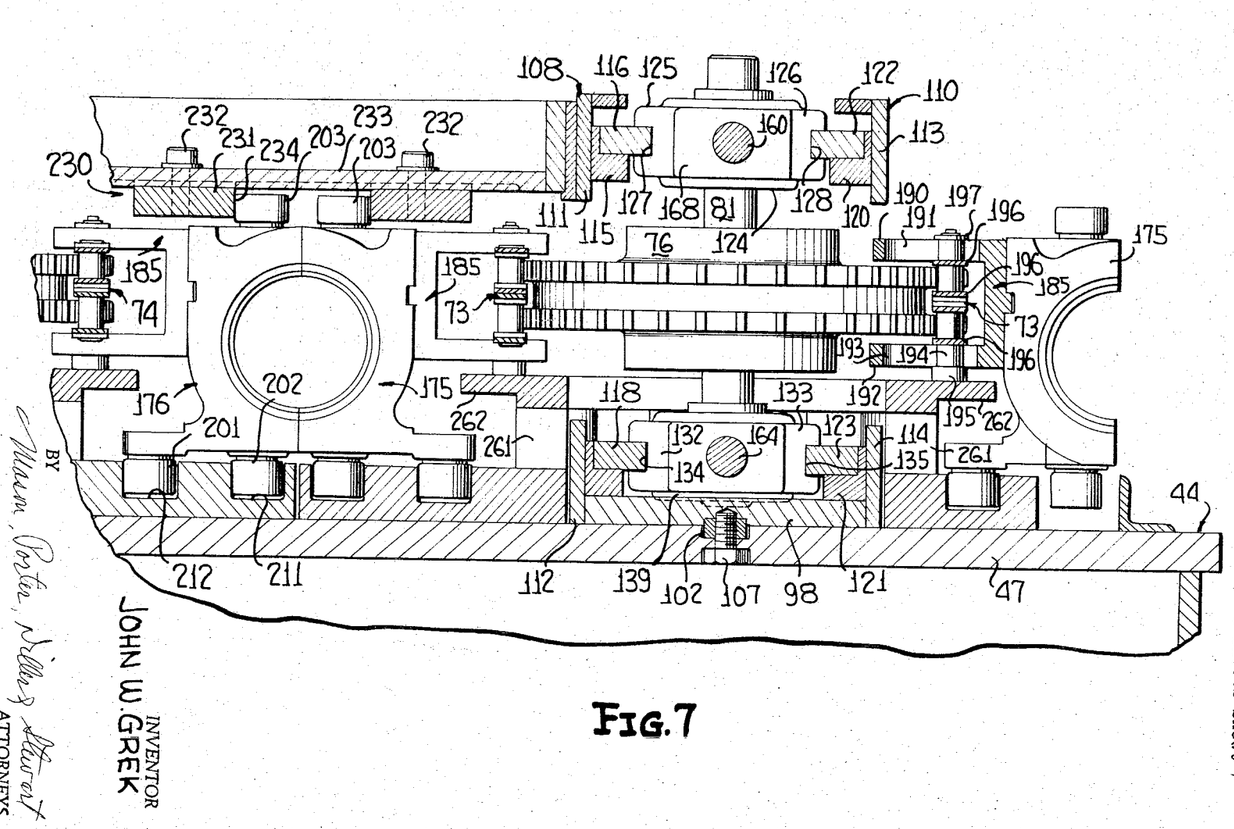
FIGURE 7 is an enlarged fragmentary transverse vertical sectional view taken along the line 7—7 of FIGURE 6 and shows further the details of the mounting of the adjustable sprocket and the specific relationship of the gripping elements, the cam followers carried by the gripping elements, and the cam tracks of the device.

A pair of gripping elements 175 of FIGURE 7 are secured to opposite runs (unnumbered) of the conveyor member 73 by means of U-shaped mounting brackets 185 associated therewith. The mounting brackets 185 are secured to the conveyor member 73 by means of identical pins 194 having enlarged heads 195. The pins 194 are passed upwardly through the slot 193 in each of the lower arms 192 through individual ones of a plurality of links 196 of the conveyor member 73. An upper end portion (unnumbered) of each of the pins 195 passes through an associated one of the slots 191 in each of the upper arms 190, and a fastener 197 secured to each of the upper end portions prevents disassembly of the pins 194 and the mounting brackets 185. As is best illustrated by the righthandmost gripping element 175 in FIGURE 7, the elongated slots 191 and 193 in the respective arms 190, 192 of the bracket 185 permits both pivotal and reciprocal movement of the gripping elements relative to the conveyor members.

Referring once again to FIGURES 8 through 11 of the drawings, the generally C-shaped body 178 of the gripping element 177 includes a lower projecting portion 200 to which is conventionally secured a freely rotatable first cam follower 201. A second cam follower 202 (FIGURE 9) is similarly secured to a lowermost portion of the body 178 in generally horizontal alignment with the first cam follower or roller 201. A third cam follower or roller 203 (FIGURES 8 and 9) is similarly conventionally secured, as by a screw 204, to an uppermost portion of the body 178 in general vertical alignment with the second cam follower or roller 202 (FIGURE 9). The pair of cam followers 201, 202 at the lowermost portion of the body 178 and the third cam follower 203 cooperate in a manner to be described more fully hereafter to urge adjacent pairs of the gripping elements 175, 176 into gripping relationship to the tubing 27 as will be described immediately hereafter with particular attention directed to FIGURES 1, 4 and 5 of the drawings.

Referring to FIGURE 1 of the drawings, adjacent associated pairs of gripping elements 175, 176 carried by the conveyor members 73, 74 respectively are initially brought into converging relationship prior to gripping the tubing 27 therebetween, as is best illustrated by the lefthandmost numbered pair of gripping elements 175, 176 of FIGURE 1. Upon a continued movement of these gripping elements from left-to-right by the conveyor members 73, 74 respectively in the manner heretofore described, the cam followers 201, 202 and 203 cooperating with cam tracks, to be immediately described, to urge the gripping elements into gripping contact with the tubing 27, as best illustrated by the centermost three pairs of gripping elements 175, 176 of FIGURE 1. Thereafter, continued left-to-right movement of adjacent pairs of the gripping elements 175, 176 causes diverging movement thereof and the subsequent release of the tubing 27.

The means for guiding the movement of the gripping elements 175, 176 in the manner just described includes a pair of cam track means 205, 206 (FIGURES 4 and 5) associated with the respective conveyor members 73, and 74. The cam track means 205 and 206 are similar in construction and a description of the cam track means 206 is considered sufficient for a complete understanding of the operation of the cam track means 205.

Figure 5:
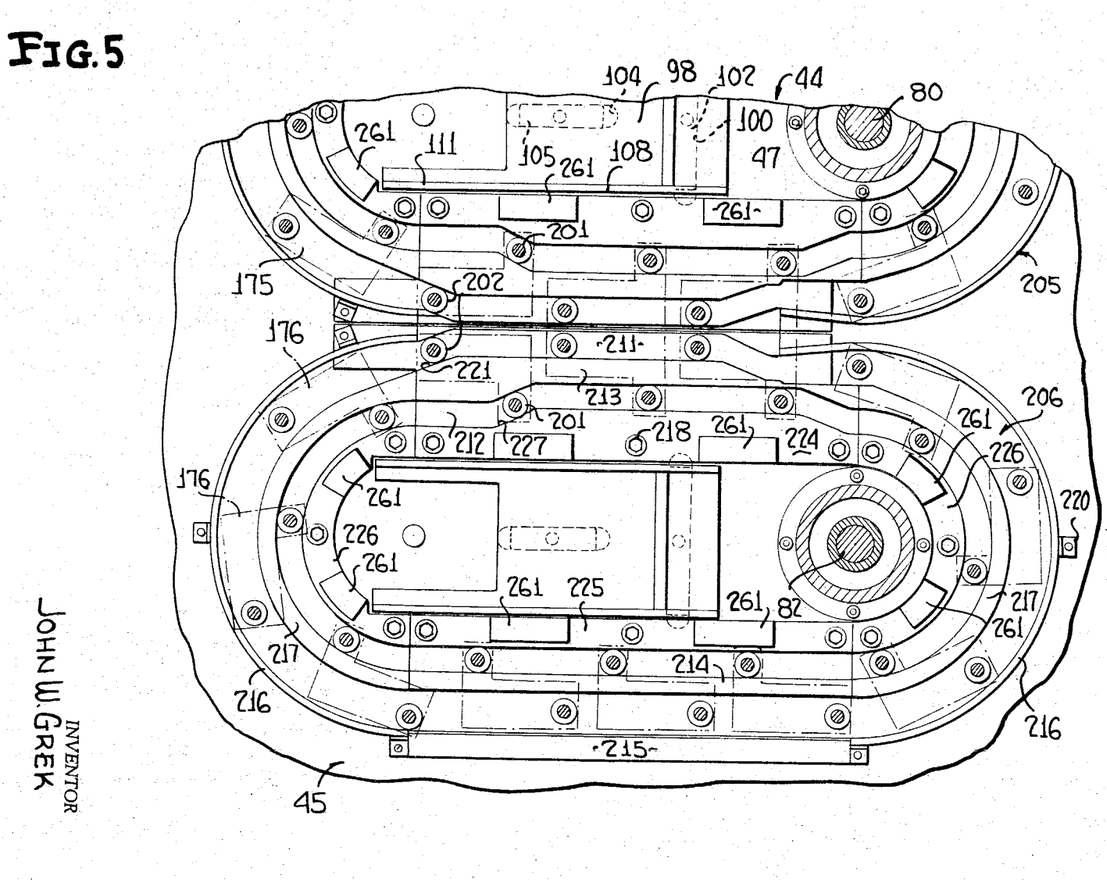
FIGURE 5 is a fragmentary horizontal sectional view taken along the line 5—5 of FIGURE 2 and shows specifically the details of the lower cam tracks for effecting the guiding of gripping elements and the maintaining of the gripping elements in parallel relation when disposed along the path of tube movement.

The cam track means 206 includes a pair of generally oval-shaped lower cam tracks 211, 212 carried by the platform 50 of the support unit 45. The cam track 211 is formed by a plurality of elongated members 213, 214 and 215 joined at the extremities thereof by a pair of substantially identical semi-circular members 216 and 217. The members 213–217 are secured to the upper platform 50 of the support unit 45 by a plurality of associated conventional bolts and brackets 218, 220 respectively (FIGURE 5). A portion of the cam track 211 is formed by appropriately forming an upwardly opening slot or groove (unnumbered) in the elongated member 213, to define an entrance cam track portion 221 converging toward the axis of the tubing 27 and the path of travel defined thereby, a central cam track portion 222 which is substantially parallel to the path of travel of the tubing 27, and an exit cam track portion 223 diverging from the axis of the tubing 27.

The second cam track 212 is formed in part by the elongated members 213, 214, the semi-circular members 217, an elongated member 224 adjacent the member 223, a similar elongated member 225 adjacent the member 214, and a pair of identical semi-circular members 226 joined between the ends of the elongated members 224 and 225. The members 224, 225 and 226 are similarly secured to the platform 50 of the support unit 45 by identically numbered conventional bolts 218 (FIGURE 5). The portion of the cam track 212 defined between the elongated members 213, and 224 includes an entrance cam track portion 227 (FIGURE 4) converging toward the axis of the tubing 27, a central cam track portion 227 paralleling this axis and a portion of the first cam track portion 222, and an exit cam track portion 230 diverging away from the axis of the tubing 27 and the path of travel defined thereby.

As is best illustrated in FIGURES 5 and 7 of the drawings, the cam follower 201 carried by each of the gripping elements 176 is received in and guided by the cam track 212 and the cam follower 202 of each of the gripping elements 176 is similarly received in and guided by the cam track 211. During the left-to-right movement of the gripping elements 176, as well as the gripping elements 175, as viewed particularly in FIGURE 5 of the drawings, the cam followers 201 and 202 engage the converging entrance cam track portions 227 and 221 respectively substantially simultaneously and are thus maintained in parallel relationship to the welded tube 27 toward and upon the clamping of the tubing 27 between pairs of the gripping elements 175, 176 (FIGURE 7).

Third cam track means 230 (FIGURES 1 and 7) cooperative with each of the cam followers 203 of the plurality of gripping elements 176 are provided in spaced relationship to the cam tracks 211 and 212, as is best illustrated in FIGURE 7 of the drawings. The cam track means 230 includes an elongated member 231 fastened by a plurality of identical bolts 232 to a plate 233 (FIGURE 7) welded or otherwise conventionally secured to the upper arm 111 of the generally inverted C-shaped plate 108. The opposite end portion (FIGURE 1) of the plate 233 is similarly secured to an upper arm (unnumbered) of the plate of the support unit 45 corresponding to the inverted C-shaped plate 108 of the support unit 45.

The elongated member 231 of the cam track 230 includes respective converging and diverging entrance and exit cam portions (unnumbered in FIGURE 1) relative to the axis of the tubing 27 and a central camming portion 234 substantially parallel to the axis of the tubing. During the movement of the plurality of gripping elements 176 by the conveyor member 73 in the manner described, the cam followers 203 are first guided by the converging camming portion (unnumbered) of the camming means 230 to urge the gripping elements 176 in generally parallel relationship toward the gripping elements 175, which are similarly urged by identical third camming means (unnumbered in FIGURES 1 and 7) acting against each of the cam followers 203 to urge the gripping elements 175 similarly toward the axis of the tubing 27, as is best illustrated in FIGURE 7 of the drawings. When the cam followers 203 of the gripping elements 176 contact the camming portion 234 of the cam track means 230, the gripping elements 176 are urged into intimate contact with the tubing 27 and the gripping elements 175 which are similarly urged toward the axis of the tubing 27 in the manner shown in FIGURE 7 of the drawings.

The cam followers 201, 202 and 203 thus cooperate with the respective cam track means 212, 211 and 230 to urge the gripping elements 176 of the plurality of pairs of gripping elements 175, 176 toward an associated one of the gripping elements 175, while the cam followers 201, 202 and 203 of the gripping elements 175 similarly cooperate with the associated camming tracks (unnumbered) to urge each of the gripping elements 175 into intimate engagement with both the tubing 27 and the gripping elements 176. In this manner each of the associated pair of gripping elements 175, 176 intimately engage, grip and tow the tubing 27 from left-to-right as viewed in FIGURES 1 and 4 of the drawings.

Figure 10:
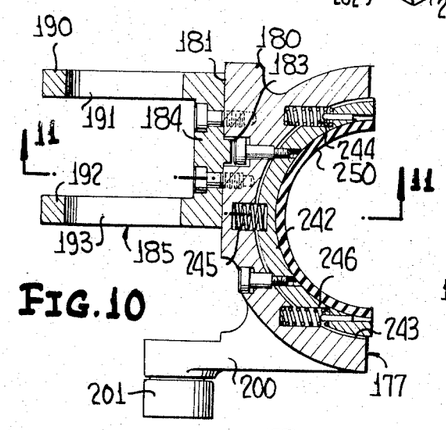
FIGURE 10 is a vertical sectional view taken along the line 10—10 of FIGURE 9 and shows the specific details of construction of the gripping element and the relationship thereof to its respective mounting bracket.

Each of the gripping elements 175, 176 are provided with means 240, 241 illustrated with respect to the gripping element 177 of FIGURES 8 through 11 of the drawings for positively gripping the tubing 27 during the towing thereof by associated ones of the pairs of gripping elements 175, 176. The gripping means 240, 241 are spaced axially relative to the generally C-shaped body 178 of the gripping element 177, and each of the gripping means 240, 241 comprises a generally C-shaped insert 242 positioned in a groove 243 formed in a face 244 of the gripping element body 178. Each of the inserts 242 is normally maintained in spring biased spaced relationship relative to the associated grooves 243 by a plurality of springs 244–246 housed in bores (unnumbered) in the body 178 and the insert 242 (FIGURE 10). A plurality of headed bolts 247 pass through bores (unnumbered) in the gripping element body 178 and are threaded into threaded bores (also unnumbered) in the inserts 242 to limit the movement of the inserts 242 under the influence of the springs 244–246 in the manner clearly illustrated in FIGURE 10 of the drawings. A semi-circular sleeve 250 of Teflon, polyethylene, rubber or similar material having a relatively high coefficient of friction is adhesively secured to each of the inserts 242 of the gripping means 240, 241.

As was heretofore noted, the pairs of gripping elements 175, 176 are identical to the gripping element 177. Therefore, as associated ones of the pairs of gripping elements 175, 176 clampingly engage the tubing 27 the sleeves 250 of the gripping means 240, 241 of each of the gripping elements 175, 176 first contact the exterior of the tubing 27. As the gripping elements 175, 176 are urged toward each other under the influence of the cam followers 201–203 and the associated cam track means, the inserts 242 of the gripping means 240, 241 are urged toward a position bottoming in the grooves 243 against the influence of the springs 244–246. In this manner the tubing 27 is effectively and resiliently clamped between associated pairs of the gripping elements 175, 176 during the towing thereof toward and through the forming and cutting device 30 to be described hereafter.

Figure 4:
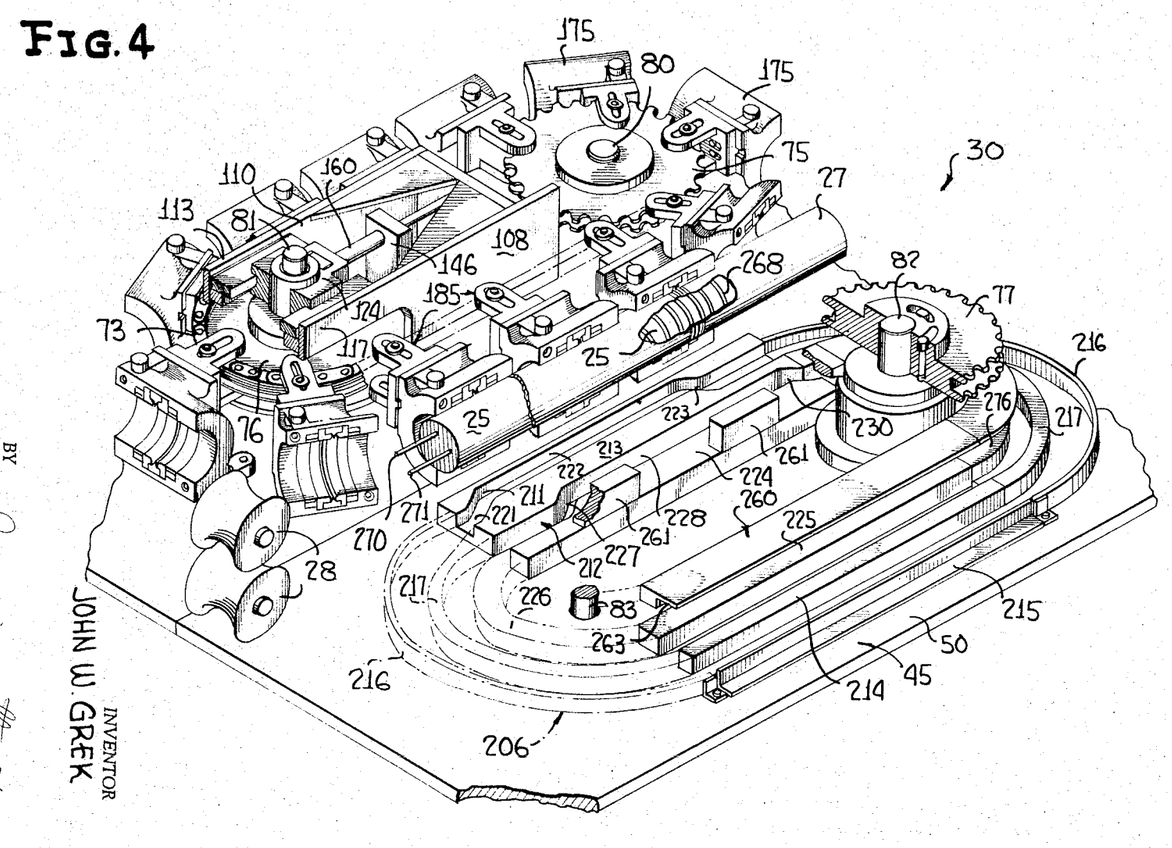
FIGURE 4 is a fragmentary perspective view of the towing and cutting device with components of one half thereof being in part omitted and in part broken away, there being shown in conjunction with the device guide rollers and a supporting horn for tubing.

During the movement of the conveyor members 73, 74 in the manner described to effect a towing of the tubing 27 the plurality of gripping elements 175 and 176 are supported by identical substantially oval supports 260 (FIGURE 4 and FIGURE 5) secured to spacer blocks 261 (FIGURES 4, 5 and 7). The supports 260 each include a flange 262 upon which the heads 195 of the pins 194 securing the gripping elements 175 and 176 to the respective conveying members 73 and 74 ride during the movement of these conveying members, as is clearly illustrated in FIGURE 7 of the drawings. In this manner the cam followers 201, 202 of the gripping elements 175, 176 are prevented from bottoming and binding in the respective cam track means and the cam followers 203 are similarly prevented from abutting against the underside of the plate 233.

The tubing 27 is initially drawn or towed through the pair of hour-glass rolls 28 (FIGURE 4) prior to being towed in external telescopic relationship to the horn, generally referred to by the reference numeral 25. The horn 25 can be, for example, a conventional forming horn of a body maker or for an extension thereof, and is preferably supported in the position illustrated in FIGURE 4 of the drawings by a conventional body maker horn supporter bracket (not shown). A multi-turn coil 268 formed of conductive material circumferentially surrounds a portion of the horn 25. The individual turns (unnumbered) of the coil 268 are preferably received in circumferential grooves (unnumbered) in the surrounded portion of the horn 25 to present a smooth unbroken surface over which the tubing 27 can be drawn during the towing thereof by the gripping elements 175, 176. The coil 268 is energized from a suitable direct current supply of electrical power (not shown) over a pair of leads 270, 271 (FIGURE 4) passed through axial bores (unnumbered) in the horn 25.

The direct current supply is of a sufficient magnitude to establish a magnetic field in the area of the coil 268 and, in a well known manner, induce a generally circumferential flow of current in the tubing 27. The radially outwardly directed forces of this magnetic field repel the portion of the tubing 27 in the area of the coil 268 radially outwardly toward and against cutting means 280 and flanging means 281, 282 (FIGURE 8) forming portions of each of the pairs of gripping elements 175, 176, to simultaneously flange and cut the tubing 27 in a manner which will be best understood by first describing the means 280–282 with particular reference to the gripping element 177 of FIGURES 8 through 11 of the drawings.

Figure 11:
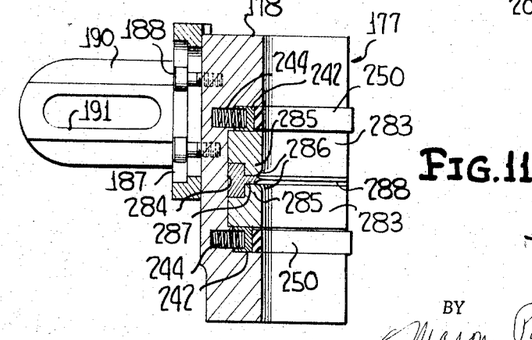
FIGURE 11 is a horizontal sectional view taken along the line 11—11 of FIGURE 10 and shows further the details of construction of the gripping element and its associated mounting bracket.

The flanging means 281, 282 are substantially identical and each is in the form of a semi-circular forming die or insert 283 positioned in a groove 284 of the body 178 to either side of the cutting means 280 (FIGURES 8 and 11). The forming dies 283 include opposing die portions 285 defining semi-circular forming shoulders 286.

The cutting means 280 comprises a cutting die or insert which is generally semi-circular and is substantially T-shaped in transverse cross-section. A leg portion 287 of the cutting die 285 is positioned between the die portions 285 of the forming dies 283, and terminates in a sharp cutting edge 288 adjacent and spaced from the forming shoulders 286 (FIGURE 11).

As the tubing 27 in the area of the coil 268 is repelled radially outwardly under the influence of the magnetic field established in the manner heretofore described, the tubing portion is repelled radially outwardly toward and against means identical to the means 280–282 of the gripping element 177 carried by associated pairs of the gripping elements 175, 176 gripping the tubing 27 therebetween. As the portion of the tubing 27 is thus repelled radially outwardly, the tubing is circumferentially cut or severed by the cutting edge 288 of the cutting means 280 carried by the pair of cutting elements 175, 176, and the edge portions of the tubing 27 adjacent this severed edge are forced into intimate contact with and conformed to the general configuration of the forming shoulders 286 of the forming means 281, 282. In this manner, the tubing 27 is formed into the flanged can bodies 20 which are individually released after the cutting and forming operation heretofore described by the diverging movement of the gripping elements 175, 176 beyond the coil 268.

From the foregoing, it will be seen that novel and advantageous provisions have been made for carrying out the desired end. However, variations and additions may be made to the invention thus far described. For example, while the mounting brackets 185 are adjustable relative to the gripping elements 175, 176 for maintaining axial alignment between associated pairs of the gripping elements 175, 176, it is to be understood that the gripping elements and mounting brackets may be integral members. Furthermore, while the gripping elements 175, 176 are maintained accurately aligned for the most part by adjustment of the mounting brackets 185, additional means may be provided for maintaining alignment between these gripping elements.

One such means for additionally assuring alignment between the gripping members 175, 176 is partially illustrated in FIGURE 8 of the drawings. Referring to FIGURE 8, upper and lower faces 290 and 291 of the C-shaped body 178 are provided with generally frusto-conical recesses or seats 292, 293 respectively at opposite corners or portions of the faces 290, 291. The gripping elements 275 are similarly constructed (FIGURE 4). However, the gripping elements 176 are provided with substantially conical projections or fingers projecting outwardly from the faces thereof corresponding to the faces 290, 291 of the gripping element 177. These projections or fingers (unnumbered) register with and are seated in the seats 292, 293 of the gripping elements 175 to additionally insure alignment between associated pairs of the gripping elements 175, 176 as the same grip and tow the tubing 27 in the manner heretofore described.

Other variations and modifications in the arrangement of parts are apparent, and such other variations and arrangements are considered to be within the spirit and scope of this invention as defined in the appended claims.

I claim:

1. An apparatus for the continuous forming of can bodies from a strip comprising a first apparatus having means for shaping the strip into tubular form and means for forming a longitudinal seam therein to define a continuous tube, and a second apparatus cooperating with said first apparatus for separating the tube into can bodies, said second apparatus including a towing mechanism for towing the tube and controlling the rate of tube forming by said first apparatus, and tube cut-off means incorporated in said towing mechanism for cutting the tube into predetermined lengths.

2. The apparatus of claim 1 wherein said towing mechanism includes a plurality of spaced gripping elements and said tube cut-off means includes equally spaced cutting dies carried by said gripping elements.

3. The apparatus of claim 1 wherein said towing mechanism includes a plurality of spaced gripping elements, said tube cut-off means includes equally spaced cutting dies carried by said gripping elements, and resilient tube gripping members carried by each gripping element on opposite sides of each cutting die.

4. An apparatus for the continuous forming of can bodies from a strip comprising a first apparatus having means for shaping the strip into tubular form and means for forming a longitudinal seam therein to define a continuous tube, a second apparatus cooperating with said first apparatus for separating the tube into can bodies, said second apparatus including a towing mechanism for towing the tube and controlling the rate of tube forming by said first apparatus, and tube cut-off means incorporated in said towing mechanism for cutting the tube into predetermined lengths, and a tube guiding and supporting horn extending within and between said first and second mechanisms.

5. An apparatus for the continuous forming of flanged can bodies from a strip comprising a first apparatus having means for shaping the strip into tubular form and means for forming a longitudinal seam therein to define a continuous tube, and a second apparatus cooperating with said first apparatus for separating the tube into flanged can bodies, said second apparatus including a towing mechanism for towing the tube and controlling the rate of tube forming by said first apparatus, and tube cut-off and flanging means incorporated in said towing mechanism for cutting the tube into predetermined lengths and flanging the ends of said tube lengths.

6. The apparatus of claim 5 wherein said towing mechanism includes a plurality of spaced gripping elements, said tube cut-off means includes equally spaced cutting dies carried by said gripping elements, and flanging dies carried by each gripping element on opposite sides of the cutting die thereof.

7. The apparatus of claim 5 wherein said towing mechanism includes a plurality of spaced gripping elements, said tube cut-off means includes equally spaced cutting dies carried by said gripping elements, flanging dies carried by each gripping element on opposite sides of the cutting die thereof, and a resilient tube gripping member carried by each gripping element adjacent to each flanging die remote from the associated cutting die.

8. An apparatus for the continuous forming of can bodies from a strip comprising a first apparatus having means for shaping the strip into tubular form and means for forming a longitudinal seam therein to define a continuous tube, a second apparatus cooperating with said first apparatus for separating the tube into can bodies, said second apparatus including a towing mechanism for towing the tube and controlling the rate of tube forming by said first apparatus, and tube cut-off means incorporated in said towing mechanism for cutting the tube into predetermined lengths, a tube guiding and supporting horn extending within and between said first and second mechanisms, and tube expanding means carried by said horn for outwardly expanding the tube as each cutting die is aligned with said tube expanding means.

9. A gripping unit for use in a tube towing mechanism, said gripping unit comprising a pair of cooperating gripping elements adapted to encircle a tube, and said gripping elements having cooperating cutting dies for severing a tube when the tube is outwardly expanded in alignment with said cutting dies.

10. A gripping unit for use in a tube towing mechanism, said gripping unit comprising a pair of cooperating gripping elements adapted to encircle a tube, said gripping elements having cooperating cutting dies for servering a tube when the tube is outwardly expanded in alignment with said cutting dies, and flanging dies disposed on opposite sides of each cutting die for flanging severed tube ends.

11. A gripping unit for use in a tube towing mechanism, said gripping unit comprising a pair of cooperating gripping elements adapted to encircle a tube, said gripping elements having cooperating cutting dies for severing a tube when the tube is outwardly expanded in alignment with said cutting dies, and resilient tube gripping members disposed in said gripping elements on opposite sides of said cutting dies.

12. A gripping unit for use in a tube towing mechanism, said gripping unit comprising a pair of cooperating gripping elements adapted to encircle a tube, said gripping elements having cooperating cutting dies for severing a tube when the tube is outwardly expanded in alignment with said cutting dies, flanging dies disposed on opposite sides of each cutting die for flanging severed tube ends, and resilient tube gripping members disposed in said gripping elements adjacent said flanging dies remote from said cutting dies.

13. A gripping unit for use in a tube towing mechanism, said gripping unit comprising a pair of cooperating gripping elements adapted to encircle a tube, said gripping elements having cooperating cutting dies for severing a tube when the tube is outwardly expanded in alignment with said cutting dies, flanging dies disposed on opposite sides of each cutting die for flanging severed tube ends, and resilient tube gripping members disposed in said gripping elements adjacent said flanging dies remote from said cutting dies, said gripping elements being in the form of resilient rubber-like inserts resiliently mounted in said gripping elements and normally projecting therefrom.

14. A tube towing and severing apparatus comprising a pair of endless conveyor members having opposed runs, means connected to said conveyor members for driving said conveyor members in unison, aligned gripping elements carried by said conveyor members for cooperation in pairs along said opposed runs to grip and tow a tube between said opposed runs, cutting dies carried by said gripping elements for severing a tube gripped by a cooperating pair of said gripping elements, and a tube expander positioned between said opposed runs for outwardly expanding a gripped tube in alignment with said cutting dies whereby a tube being towed in automatically severed.

15. The apparatus of claim 14 wherein said gripping elements also have flanging dies for automatically flanging severed tube ends.

16. The apparatus of claim 14 wherein the gripping elements of each pair of gripping elements have interlocking means for assuring the alignment of said gripping elements and the cutting dies thereof.

17. The apparatus of claim 14 wherein said apparatus includes a base, support means carried by said base mounting one of said conveyor members for movement towards and away from the other of said conveyor members in a direction whereby the spacing between said opposed runs may be selectively varied, and means connected between said base and said support means for effecting the positioning of said one conveyor member.

18. A tube towing apparatus comprising a pair of endless chains supported for movement along predetermined paths including two opposed runs, each of said chains being formed of a plurality of connected links and carrying brackets, cooperating gripping elements, and means mounting said gripping elements for adjustment in the direction of movement of said gripping elements.

19. An apparatus for the continuous forming of discrete tubular bodies from a continuous tube comprising a conveying mechanism for conveying the tube along a predetermined path, and tube cut-off means incorporated in and movable with the said conveying means for cutting the tube into predetermined lengths.

20. The apparatus as defined in claim 19 wherein said conveying mechanism includes a plurality of spaced gripping elements and said tube cut-off means includes equally spaced cutting dies carried by said gripping elements.

21. The apparatus as defined in claim 19 including further means incorporated in and movable with said towing mechanism for flanging the cut lengths of the tubes.

22. The apparatus as defined in claim 20 including means for expanding the tube radially into engagement with said cut-off means.

23. The apparatus as defined in claim 21 including means for radially expanding the tube into engagement with said flanging means.

References Cited

UNITED STATES PATENTS

| | | | |
|---|---|---|---|
| 2,211,242 | 8/1940 | McIntosh | 72—332 |
| 2,262,292 | 11/1941 | Ladd | 113—115 |
| 2,484,854 | 10/1949 | Peters | 113—120 |
| 3,056,535 | 10/1962 | Baugh et al. | 226—172 |
| 3,094,092 | 6/1963 | Stuchbery et al. | 113—115 |
| 3,124,872 | 3/1964 | Knodel | 113—120 |
| 3,256,846 | 6/1966 | Keinanen | 113—120 |

CHARLES W. LANHAM, *Primary Examiner.*

A. RUDERMAN, *Assistant Examiner.*